US008659657B2

(12) United States Patent
Brumfield et al.

(10) Patent No.: US 8,659,657 B2
(45) Date of Patent: Feb. 25, 2014

(54) SYSTEM AND METHOD FOR PATTERN BASED THRESHOLDING APPLIED TO VIDEO SURVEILLANCE MONITORING

(75) Inventors: Sara Carlstead Brumfield, Austin, TX (US); Xiaoping Chen, Austin, TX (US); Tara Leigh Marshburn, Austin, TX (US); Sandra Lee Tipton, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1351 days.

(21) Appl. No.: 12/019,768

(22) Filed: Jan. 25, 2008

(65) Prior Publication Data

US 2009/0189983 A1 Jul. 30, 2009

(51) Int. Cl.
*H04N 7/18* (2006.01)
*G08B 1/08* (2006.01)

(52) U.S. Cl.
USPC ........... 348/143; 348/151; 348/155; 348/158; 348/159; 340/539.15

(58) Field of Classification Search
None
See application file for complete search history.

(56) References Cited

U.S. PATENT DOCUMENTS

| | | | | |
|---|---|---|---|---|
| 5,828,809 A | 10/1998 | Chang et al. | | 386/69 |
| 6,011,579 A * | 1/2000 | Newlin | | 348/14.08 |
| 6,585,521 B1 | 7/2003 | Obrador | | 434/236 |
| 6,628,835 B1 | 9/2003 | Brill et al. | | 382/226 |
| 6,720,880 B2 * | 4/2004 | Gutta et al. | | 340/573.4 |
| 6,973,256 B1 * | 12/2005 | Dagtas | | 386/241 |
| 7,774,032 B2 * | 8/2010 | Swan et al. | | 455/575.3 |
| 7,839,432 B2 * | 11/2010 | Fernandez et al. | | 348/143 |
| 2003/0051026 A1 * | 3/2003 | Carter et al. | | 709/224 |
| 2003/0063004 A1 * | 4/2003 | Anthony et al. | | 340/574 |
| 2004/0164896 A1 * | 8/2004 | Evans | | 342/357.07 |
| 2005/0120160 A1 * | 6/2005 | Plouffe et al. | | 711/1 |

OTHER PUBLICATIONS

Collins et al., "A System for Video Surveillance and Monitoring," Carnegie Mellon University, 2000.
Hauptmann et al., "Automated Analysis of Nursing Home Observations," Pervasive Computing, IEEE, Apr.-Jun. 2004, pp. 15-21.

* cited by examiner

*Primary Examiner* — Ranodhi Serrao
*Assistant Examiner* — Farrukh Hussain
(74) *Attorney, Agent, or Firm* — VanLeeuwen & VanLeeuwen; Jeffrey S. LaBaw

(57) ABSTRACT

A system, method, and program product is provided that configures video handlers pertaining to a dependent individual. Configuring includes setting alert thresholds. Visual locations are configured. Visual images that pertain to caregivers of the dependent individual are configured. Video streams are received from video sources. Video streams are compared to configured locations to classify the dependent individual's location. Video stream is analyzed to determine whether the dependent individual is alone or with others. If with others, a list of known persons is determined by comparing the video streams with the configured visual images. The configured video handlers are initiated based on the inputs of the location and the people present with the dependent individual. Video handlers trigger alerts when thresholds are reached. Alerts include performing actions to protect the dependent individual from harm.

14 Claims, 8 Drawing Sheets

SYSTEM AND METHOD FOR PATTERN BASED THRESHOLDING APPLIED TO VIDEO SURVEILLANCE MONITORING

BACKGROUND OF THE INVENTION

1. Technical Field

The present invention relates to a system and method that provides pattern-based surveillance monitoring. More particularly, the present invention relates to a system and method that provides pattern-based video and audio surveillance for dependent individuals, such as children and the elderly.

2. Description of the Related Art

The field of surveillance monitoring experienced increased research and development for purposes of military and urban applications. As technology becomes more accessible, surveillance technology is filtering down into the home. For example "nanny cams" are often used to record the activities of a child's caregiver. A challenge of current implementations however, is that traditional home-based surveillance technologies require live monitoring or reviewing lengthy amounts of pre-recoded information. For example, a parent could set a nanny cam to record the nanny's actions throughout the day but would have to review (scan or watch) the entire recording in order to identify any situations where the nanny acted inappropriately. Because of these shortcomings, many parents and guardians are reluctant to use surveillance technology due to these difficulties.

In response to terrorist threats, a vast amount of research has been performed in the area of automating video surveillance monitoring. Much of this research has been commissioned by the U.S. Department of Defense (DOD) Advance Research Project Agency, and therefore focuses on military and urban commercial applications. Although better surveillance technology now exists, based on the efforts of the DOD and others, domestic (non-commercial) applications do not take advantage of these technology advances and are continuing to use traditional "nanny cam" home-based surveillance as described above.

One concern with traditional surveillance technology used to monitor children is that there is no way to recognize that a child or other dependent (e.g., elderly person, disabled individual, etc.) is in a dangerous situation until long after the situation has passed, often with disastrous consequences. What is needed, therefore, is a system that analyzes video and audio surveillance data in real time, and provides alerting capability when events occur that put a dependent in danger. Furthermore, what is needed is a system and method that reports on the general level of care provided for the child.

SUMMARY

It has been discovered that the aforementioned challenges are resolved using a system, method and computer program product that allows a user to configure a video handlers that pertain to a dependent individual, such as a child, elderly person, or disabled individual. The configuring of some of the video handlers includes setting alert thresholds. The user further configures visual locations, such as rooms or places where the dependent individual is often present (e.g., the individual's home and surroundings). Visual images that pertain to caregivers, such as nannies or nurses, of the dependent individual are captured and configured. Video streams are then received from video sources, such as video cameras, that are directed to the dependent individual. The video streams are compared to the configured locations to classify a location of the dependent individual. In addition, the video stream is analyzed to determine whether the dependent individual is alone or with others. If the dependent individual is with others, a list of known persons, such as caregivers, is determined by comparing the video streams with the configured visual images. The configured video handlers are initiated based on the inputs of the location and the people present with the dependent individual (if any). The initiated video handlers trigger alerts when the configured thresholds are reached. These alerts include performing actions that are intended to protect the dependent individual from harm.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood; and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
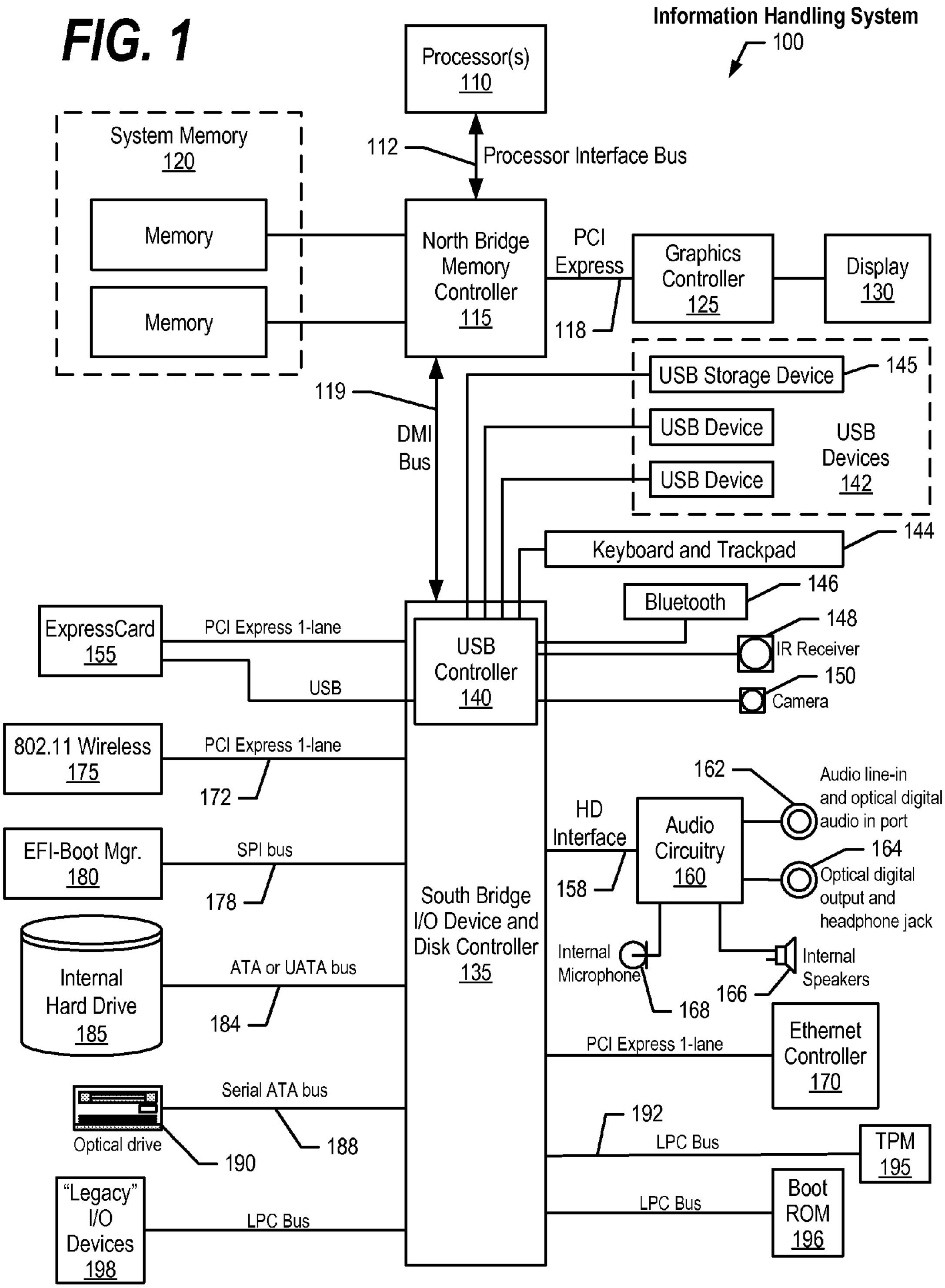
FIG. 1 is a block diagram of a data processing system in which the methods described herein can be implemented.
Figure 2:
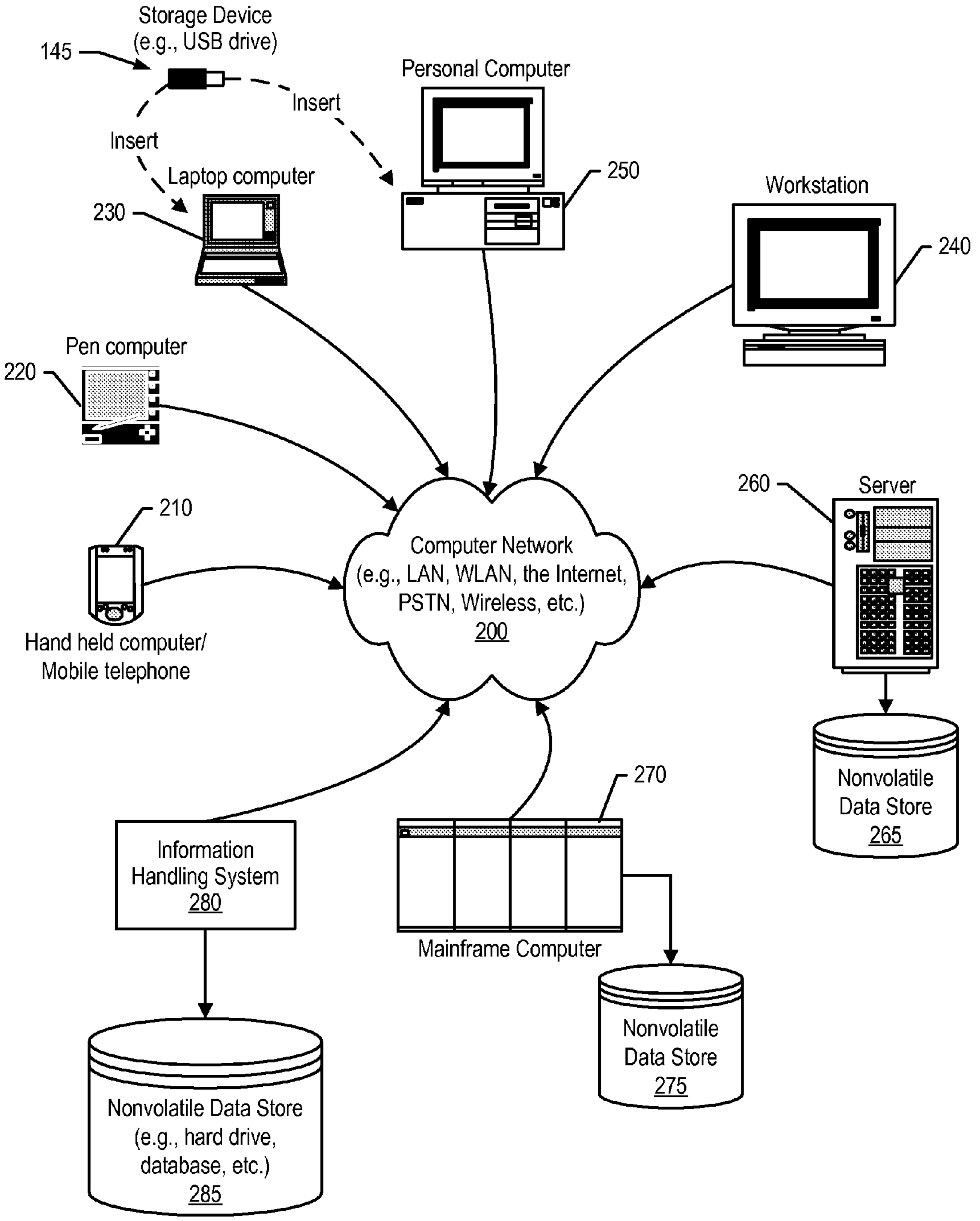
FIG. 2 provides an extension of the information handling system environment shown in FIG. 1 to illustrate that the methods described herein can be performed on a wide variety of information handling systems which operate in a networked environment.

FIG. 1 illustrates information handling system 100 which is a simplified example of a computer system capable of performing the computing operations described herein. Information handling system 100 includes one or more processors 110 which is coupled to processor interface bus 112. Processor interface bus 112 connects processors 110 to Northbridge 115, which is also known as the Memory Controller Hub (MCH). Northbridge 115 is connected to system memory 120 and provides a means for processor(s) 110 to access the system memory. Graphics controller 125 is also connected to Northbridge 115. In one embodiment, PCI Express bus 118 is used to connect Northbridge 115 to graphics controller 125. Graphics controller 125 is connected to display device 130, such as a computer monitor.

Northbridge 115 and Southbridge 135 are connected to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus is used to connect the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses can include PCI and PCI Express busses, an ISA bus, a System Management Bus (SMBus or SMB), a Low Pin Count (LPC) bus. The LPC bus is often used to connect low-bandwidth devices, such as boot ROM 196 and "legacy" I/O devices (using a "super I/O" chip). The "legacy" I/O devices (198) can include serial and parallel ports, keyboard, mouse, floppy disk controller. The LPC bus is also used to connect Southbridge 135 to Trusted Platform Module (TPM) 195. Other components often included in Southbridge 135 include a Direct Memory Access (DMA) controller, a Programmable Interrupt Controller (PIC), a storage device controller, which connects Southbridge 135 to nonvolatile storage device 185, such as a hard disk drive, using bus 184.

ExpressCard 155 is a slot used to connect hot-pluggable devices to the information handling system. ExpressCard 155 supports both PCI Express and USB connectivity as it is connected to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, Bluetooth device 146 which provides for wireless personal area networks (PANs), keyboard and trackpad 144, and other miscellaneous USB connected devices 142, such as a mouse, portable storage devices, modems, network cards, ISDN connectors, fax, printers, USB hubs, and many other types of USB connected devices.

Wireless Local Area Network (LAN) device 175 is connected to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 is connected to Southbridge 135 using Serial ATA (SATA) bus 188. Serial ATA adapters and devices communicate over a high-speed serial link. The Serial ATA bus is also used to connect Southbridge 135 to other forms of storage devices, such as hard disk drives. Audio circuitry 160, such as a sound card, is connected to Southbridge 135 via bus 158. Audio circuitry 160 is used to provide functionality such as audio line-in and optical digital audio in port 162, optical digital output and headphone jack 164, internal speakers 166, and internal microphone 168. Ethernet controller 170 is connected to Southbridge 135 using a bus, such as the PCI or PCI Express bus. Ethernet controller 170 is used to connect information handling system 100 with a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems which operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling system include nonvolatile data stores, such as hard drives and/or nonvolatile memory. Some of the information handling systems shown in FIG. 2 are depicted with separate nonvolatile data stores (server 260 is shown with nonvolatile data store 265, mainframe computer 270 is shown with nonvolatile data store 275, and information handling system 280 is shown with nonvolatile data store 285). The nonvolatile data store can be a component that is external to the various information handling systems or can be internal to one of the information handling systems. In addition, while not shown, an individual nonvolatile data store can be shared amongst two or more information handling systems using various techniques.

Figure 3:
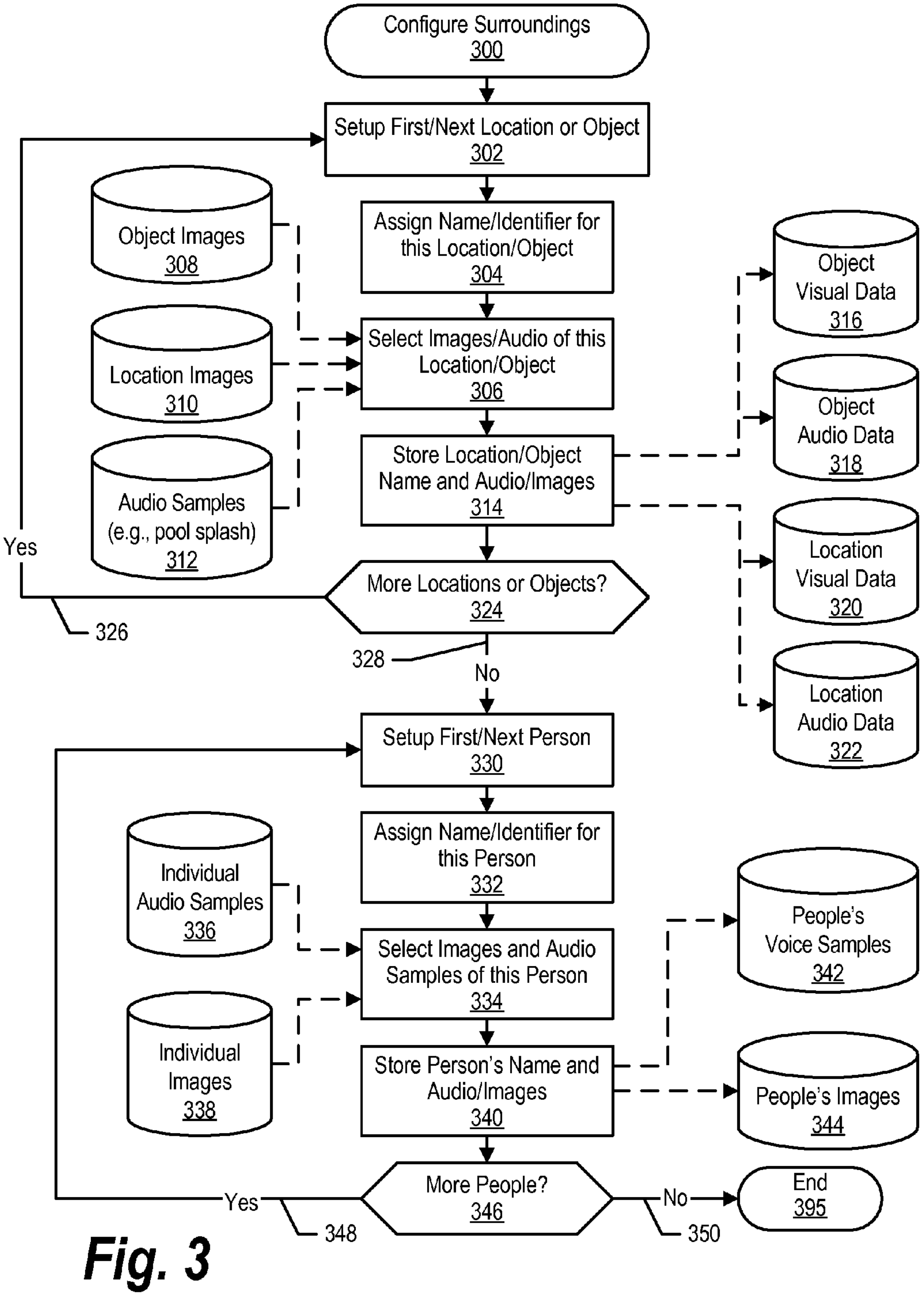
FIG. 3 is a flowchart showing steps taken to configure the surroundings of a dependent individual, such as a child.

FIG. 3 is a flowchart showing steps taken to configure the surroundings of a dependent individual, such as a child. Processing commences at 300 whereupon, at step 302, the first location or object is setup for configuring. At step 304, the user assigns a name or identifier to the location or object that is being setup. For example, the location might be a "child's room," "backyard," "kitchen," "family room," or any other location where the dependent individual (e.g., child, elderly person, disabled individual, etc.) might be found. Examples of objects include dangerous objects, such as knives and weapons, as well as objects that might be monitored, such as books, television, and the like. At step 306, images and audio of this location or object are selected. Digital images (e.g., photographs, etc.) of the locations such as a child's room are selected from location images 310. Some locations may have particular audio samples (312) that are associated with the location. For example, a splash into a swimming pool would be associated with a swimming pool location. Likewise, objects also have particular sounds associated with them, such as the sound of a refrigerator door opening, the sound of water boiling in a tea kettle, the sound of a deadbolt lock being engaged or disengaged, and the like. Similar to locations, object images 308 are selected pertaining to the various objects being configured (e.g., digital photographs of dangerous objects, such as knives and weapons, as well as objects that might be monitored, such as books, television, toys, electronic games, puzzles, etc.). At step 314, the name or identifier of the location or object that is configured is stored along with the images and audio associated with the locations and objects. Data store 316 is used to store object visual data (e.g., images of knives, weapons, toys, etc.). Data store 318 is used to store object audio data, data store 320 is used to store location visual data, and data store 322 is used to store location audio data.

A determination is made as to whether there are more locations or objects that are being configured (decision 324). If there are additional locations or objects being configured, then decision 324 branches to "yes" branch 326 which loops back to process the next location or object. This looping continues until all of the locations and objects desired to be setup by the user have been configured and stored in the appropriate data stores. At this point, decision 324 branches to "no" branch 328 in order to capture data related to people.

At step 330, the first person is setup for configuring. At step 332, the user assigns a name or identifier to the first person. For example, the name of the dependent individual (e.g., child, elderly person, etc.) would be assigned when the user is setting up the dependent individual and the name of a caregiver (e.g., nanny, nurse, mother, father, etc.) would be assigned when setting up a caregiver of the dependent individual. At step 334, the user selects audio samples from audio sample data store 336 that pertain to the person being configured and visual images from individual images data store 338 that also pertain to the person that is being configured. Examples of audio samples would include samples of the person speaking or other audible sounds that help identify the individual (e.g., the sound of a cane, wheelchair, walker, etc. that may be used by the individual). Examples of visual images include digital photographs of the individual. At step 340, the person's name, audio, and visuals are stored. The person's name (identifier) and audio samples are stored in voice samples data store 342 and the person's name (identifier) and visual images are stored in images data store 344.

A determination is made as to whether there are more people that are being configured (decision 346). If there are more people being configured, then decision 346 branches to "yes" branch 348 which loops back to process (configure) the next person and store the relevant data in data stores 342 and 344. This looping continues until all of the people desired to be setup by the user have been configured and stored in the appropriate data stores. At this point, decision 346 branches to "no" branch 350 and configuration processing ends at 395.

Figure 4:
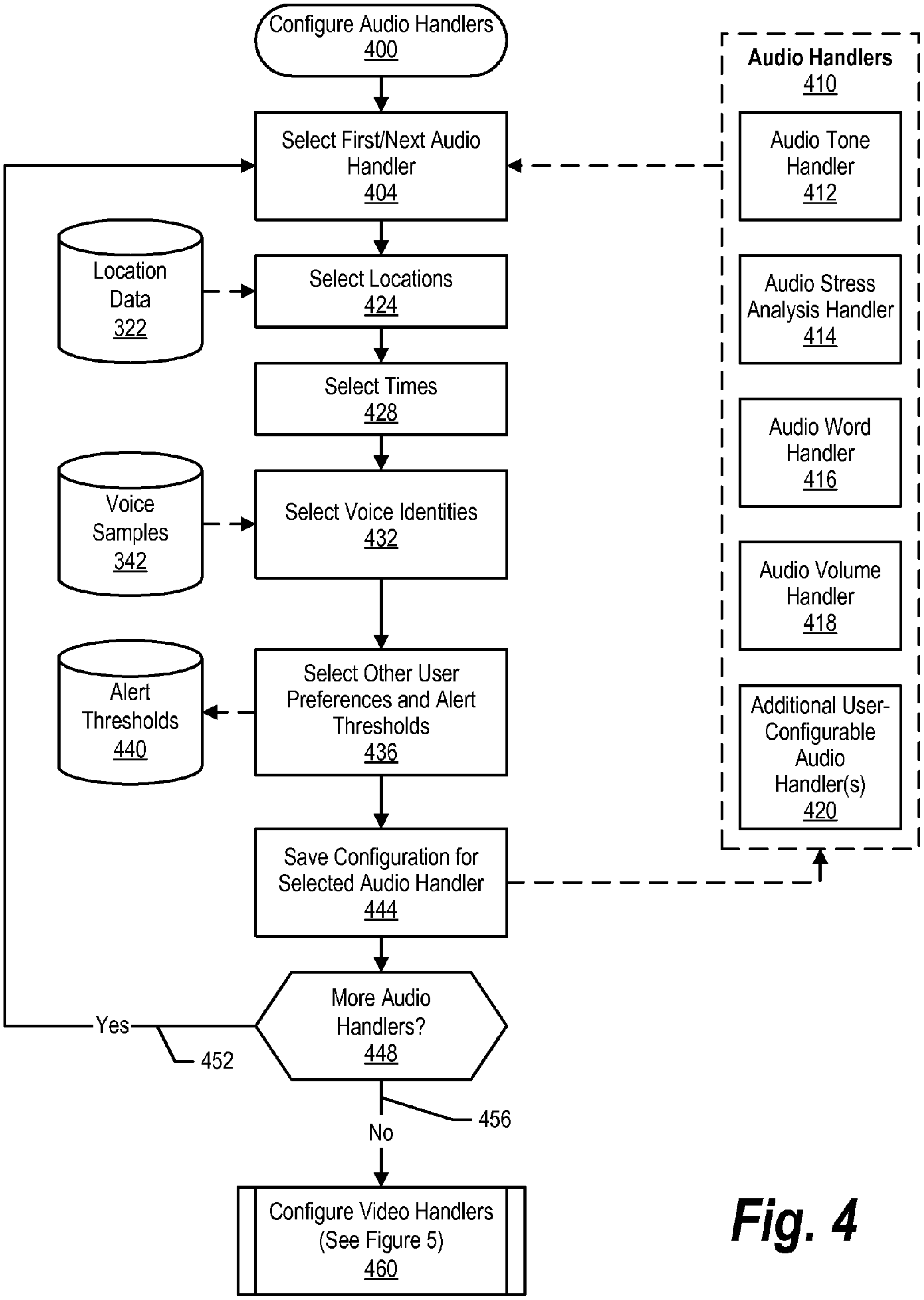
FIG. 4 is a flowchart showing steps taken to configure audio handlers.

FIG. 4 is a flowchart showing steps taken to configure audio handlers. Processing commences at 400 whereupon, at step 404, the first audio handler is selected from audio handlers 410. As shown, audio handlers include audio tone handler 412 that is used to handle various audio tones such as anger or fright. Likewise, audio stress analysis handler 414 is used to handle alerts based on the stress level detected in people's voices. Audio volume handler 418 is used to handle alerts based on the volume of a person's voice, such as shouting or screaming. Additional user-configurable audio handlers 420 are setup and configured to address different audio parameters.

At step 424, the locations where the selected audio handler applies is retrieved from location data store 322. For example, the audio volume handler may be configured differently based upon whether the person is inside or outside so that a loud voice inside a dwelling triggers an alert before the same loud voice would trigger the alert when the speaker is outside. At step 428, the times where the audio handler applies is selected by the user. For example, the sensitivity of the audio handlers may be set to lower thresholds in order to be more easily triggered during naptimes and when the dependent individual is scheduled to be sleeping. At step 432, the voice identities are selected from voice sample data store 342. The voice identities correspond to the dependent individual as well as caregivers (e.g., nannies, nurses, mother, father, etc.). Other user preferences are selected at step 436 along with alert thresholds. The alert thresholds are stored in alert threshold data store 440. At step 444, the configuration of the selected audio handler is saved.

A determination is made as to whether there are more audio handlers that the user wishes to configure (decision 448). If there are more audio handlers to configure, then decision 448 branches to "yes" branch 452 which loops back to allow the user to select and configure the next audio handler. This looping continues until the user no longer wishes to configure additional audio handlers, at which point decision 448 branches to "no" branch 456 whereupon, at predefined process 460, the user configures the video handlers (see FIG. 5 and corresponding text for processing details).

Figure 5:
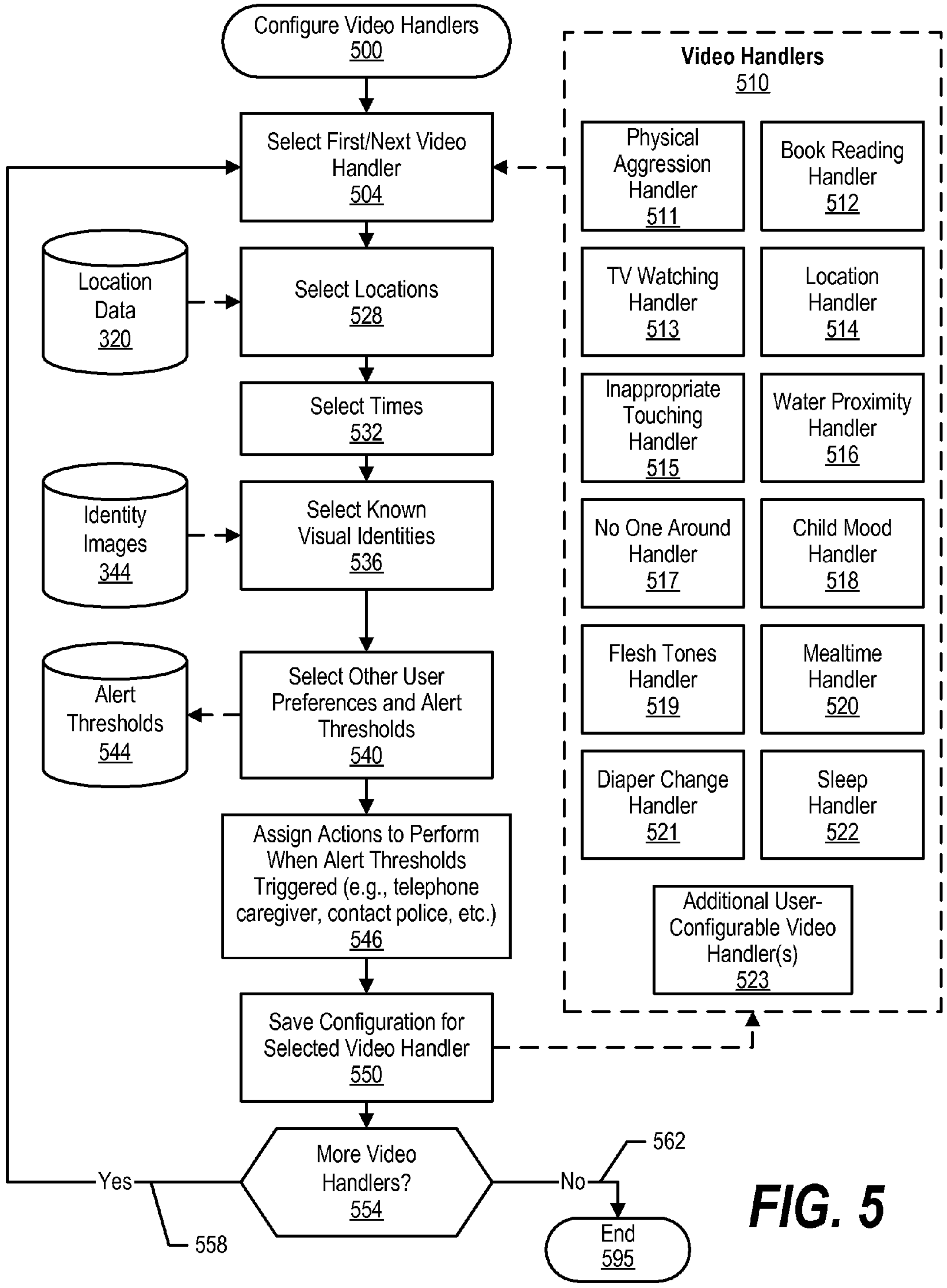
FIG. 5 is a flowchart showing steps taken to configure video handlers.

FIG. 5 is a flowchart showing steps taken to configure video handlers. Processing commences at 500 whereupon, at step 504, the first video handler to setup and configure is selected by the user from video handlers 510. As shown, examples of video handlers are plentiful and include physical aggression video handler 511 that would be triggered when the video stream indicates physical aggression or violence. Video handlers also include such things as book reading video handler 512 and television watching video handler 513 to monitor and record time spent reading and watching television. Location video handler 514 is triggered based on the dependent individual's location, such as in an area that is "out of bounds" or that could be potentially dangerous, such as in a garage, workshop, or near a swimming pool. Water proximity video handler 516 is also used when the dependent individual is near a potentially dangerous area of water such as a swimming pool, bathtub, or the like. Inappropriate touching video handler 516 is used to monitor touching of the dependent individual that may be potentially inappropriate or unwanted. No one around video handler 517 is triggered when the dependent individual is left alone. While acceptable for some periods of time, the trigger can be set to activate when the dependent individual is left alone for an unacceptable period of time or when the dependent individual is engaged in an activity that should be monitored by a caregiver, such as swimming or playing outside. Child mood video handler 518 is used to sense the mood of the dependent individual based on visual cues and perform appropriate actions if necessary. These visual cues may be set to the dependent individual being frightened, apprehensive, etc. Mealtime video handler 520 is used during meals to monitor the care and feeding of the dependent individual by a caregiver. Likewise, diaper change video handler 521 is used to monitor the care that the dependent individual receives when having a diaper or undergarment changed or cleaned. Sleep video handler 522 is used to monitor and alert caregivers of activities that may occur while the dependent individual is sleeping (or supposed to be sleeping). These activities may include when the dependent individual wakes up or leaves his or her bed/crib, when the dependent individual wakes up and requests attention (cries, etc.), or if the dependent individual experiences difficulties while sleeping such as difficulties breathing, coughing, etc. Additional user-configurable video handlers 523 can be set up and configured based on the particular needs of the dependent individual and the environment/surroundings.

At step 528, the locations where the selected video handler is active are selected from location data store 320. For example, the sleep video handler may only apply when the dependent individual is in the dependent individual's bedroom and the television watching video handler may only apply in the areas where a television is present. At step 532, the times that apply to the selected video handler are selected. For example, different alerts and thresholds may apply to the sleep video handler when during the time periods when the dependent individual is scheduled for sleeping. Likewise, the mealtime video handler can be set to be more sensitive during the time periods when the dependent individual is scheduled for various meals. At step 536, known visual entities are selected from images data store 344. These known visual entities would include the dependent individual, the caregivers (nannies, nurses, mother, father, etc.) and other people that are routinely present during the dependent individual's day. At step 540, other user preferences that may apply to the given video handler are selected as well as selecting alert thresholds that pertain to the selected video handler. The alert thresholds are stored in data store 544. At step 546, actions are assigned (selected) to be performed when the alert thresholds are triggered. For example, for mild physical aggression identified by physical aggression video handler 511, the action might be to send a message to the dependent individual's primary caregiver, such as the mother or father. However, for extreme physical aggression, the same video handler might have a higher threshold that immediately contacts public safety personnel, such as the police. At step 548, the configured video handler is saved.

A determination is made as to whether there are more video handlers that the user wishes to configure (decision 554). If there are additional video handlers to configure, then decision 554 branches to "yes" branch 558 which loops back to select and configure the next video handler. This looping continues until the user has configured all desired video handlers, at which point decision 554 branches to "no" branch 562 whereupon processing ends at 595.

Figure 6:
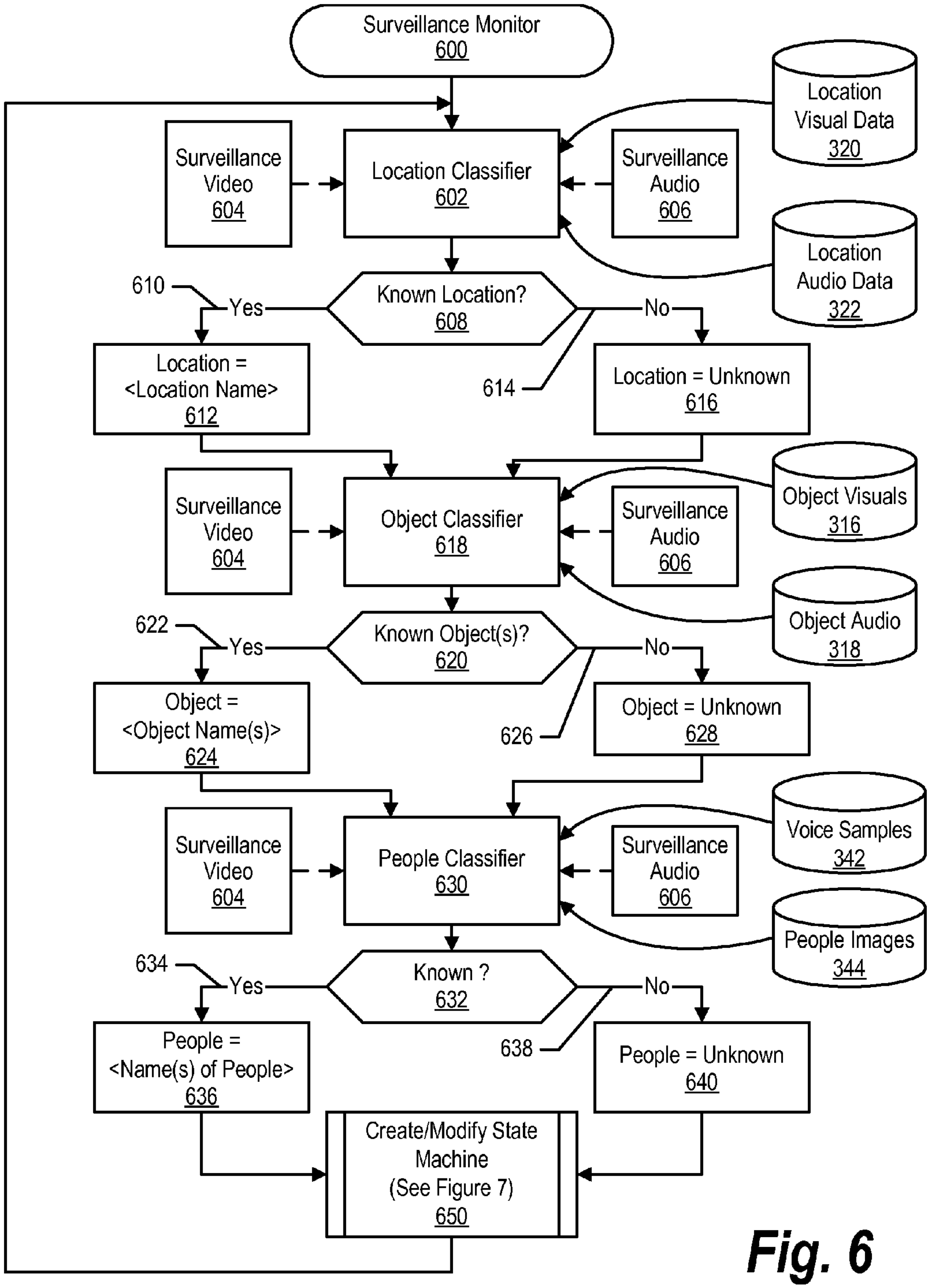
FIG. 6 is a flowchart showing steps taken to perform surveillance monitoring.

FIG. 6 is a flowchart showing steps taken to perform surveillance monitoring. Processing commences at 600 whereupon, at step 602, a location classifier receives surveillance video 604 and surveillance audio 606. The location classifier compares the video stream received from the surveillance video and the audio stream from the surveillance audio with location visual and audio data 320 and 322. A determination is made, based on comparing the audio and video streams with the location audio and visual data, as to whether the location is a known location (decision 608). If the location is a known location, then decision 608 branches to "yes" branch 610 whereupon, at step 612 the current location is set to the identified location. On the other hand, if the location is not known, then decision 608 branches to "no" branch 614 whereupon, at step 616 the location is set to "unknown."

At step 618, objects in proximity to the dependent individual are identified by object classifier 618 which also receives surveillance video 604 and surveillance audio 606. The object classifier compares the video stream received from the surveillance video and the audio stream from the surveillance audio with object visual and audio data 316 and 318. A determination is made, based on comparing the audio and video streams with the object audio and visual data, as to whether the known objects are in proximity to the dependent individual (decision 620). If known objects are in proximity to the dependent individual, then decision 620 branches to "yes" branch 622 whereupon, at step 624, the current object is set to the object, or objects, that are currently in proximity to the dependent individual. On the other hand, if there are no known objects in proximity to the dependent individual, then decision 620 branches to "no" branch 626 whereupon, at step 628, the current object is set to "unknown."

At step 630, people in proximity to the dependent individual are identified by the people classifier. People classifier 630 also receives surveillance video 604 and surveillance audio 606. The people classifier compares the video stream received from the surveillance video and the audio stream from the surveillance audio with voice samples 342 and people images 344. A determination is made, based on comparing the audio and video streams with the voice samples and people images, as to whether any known people are in proximity to the dependent individual (decision 632). If known people are in proximity to the dependent individual, then decision 632 branches to "yes" branch 634 whereupon, at step 636, the current people is set to the person, or people, that are currently in proximity to the dependent individual. On the other hand, if there are no known people in proximity to the dependent individual, then decision 634 branches to "no" branch 638 whereupon, at step 640, the current people is set to "unknown."

Figure 7:
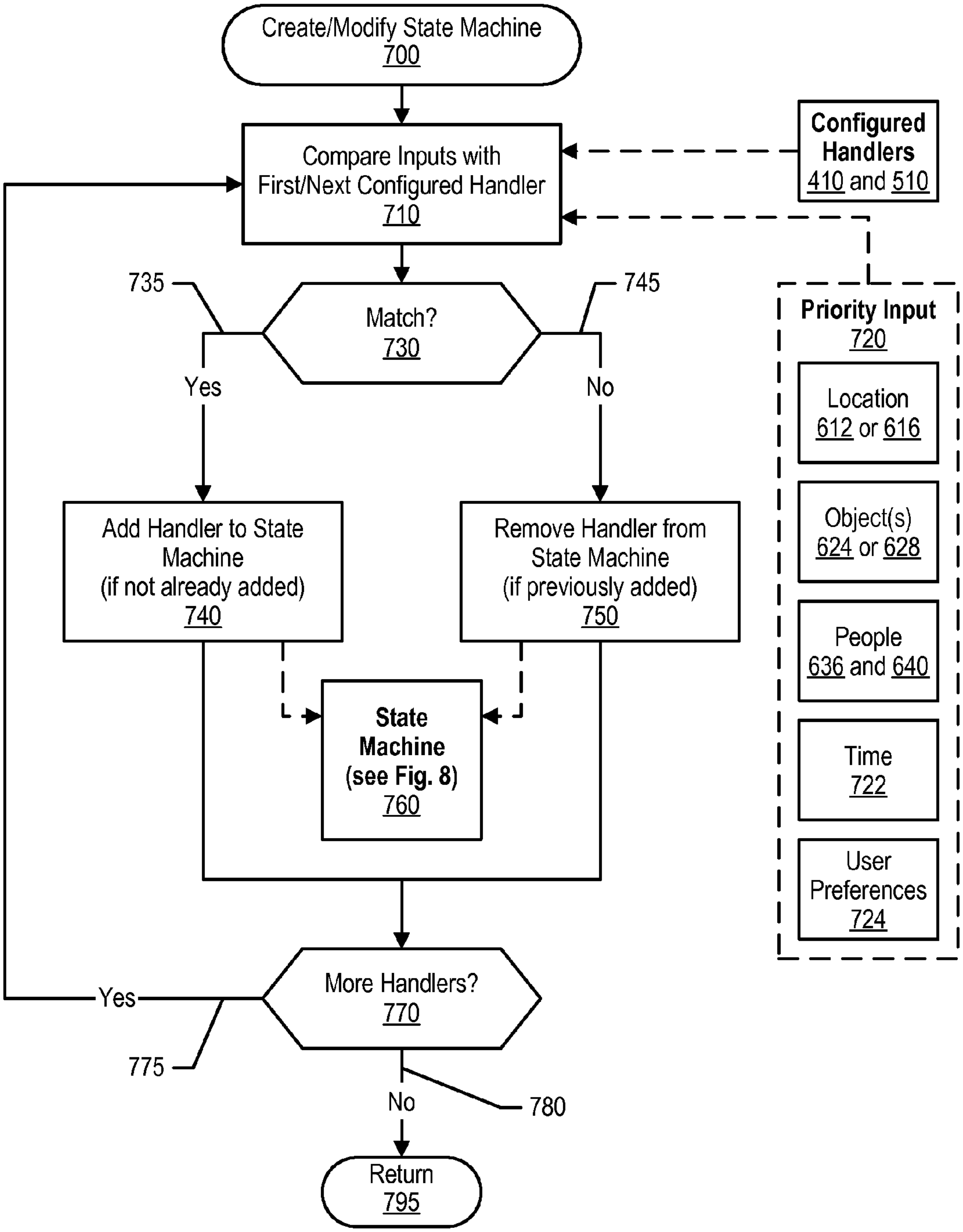
FIG. 7 is a flowchart showing steps taken to create and modify a state machine with audio and video handlers that match various inputs.

After the location classifier has identified the dependent individual's current location (if possible), the object classifier has identified any known objects in proximity to the dependent individual, and the people classifier has identified any known people in proximity to the dependent individual, a state machine is created (or modified if already created) at predefined process 650 (see FIG. 7 and corresponding text for processing details). Processing then periodically loops back to recheck the location, objects, and people and re-provides the updated data to the state machine.

FIG. 7 is a flowchart showing steps taken to create and modify a state machine with audio and video handlers that match various inputs. Processing commences at 700 whereupon, at step 710, the inputs gathered by the surveillance monitor shown in FIG. 6 are used in conjunction with additional inputs shown in priority input 720. As shown priority input 720 includes the dependent individual's current location (either 612 if a known location or 616 it an unknown location), the object(s) currently in proximity to the dependent individual (either 624 if known objects are in proximity or 628 if no known objects are in proximity), and the people currently in proximity to the dependent individual (either 636 if known people are in proximity or 640 if no known people are in proximity). In addition, priority inputs 720 include current time of day 722 and any additional user preferences 724 that may apply to any of the audio or video handlers. These priority inputs are compared to the first handler selected from the set of configured audio and video handlers 410 and 510.

A determination is made as to whether the priority inputs matches the first selected configured handler (decision 730). It the priority inputs match the selected handler, then decision 730 branches to "yes" branch 735 whereupon, at step 740, the handler is added to state machine 760 (if the handler has not yet been added to the state machine). On the other hand, if the priority inputs do not match the selected handler, then decision 730 branches to "no" branch 745 whereupon, at step 750, the handler is removed from state machine 760 (if the handler was previously added to the state machine). For example, if the dependent individual was in the kitchen eating dinner, the mealtime video handler may have been added to the state machine. Now, however, the dependent individual has finished dinner and has been put to bed in the dependent individual's bedroom. The mealtime video handler is no longer needed, however based on the priority inputs, the sleep video handier would be added to the state machine. Operation of the state machine is shown in FIG. 8.

A determination is made as to whether there are more configured handlers (audio and video handlers) to process (decision 770). If there are more handlers to process, then decision 770 branches to "yes" branch 775 which loops back to select the next configured handler (410 and 510) and compare the priority inputs with the selected handler. This looping continues until there are no more configured handlers to process, at which point decision 770 branches to "no" branch 780 and processing returns to the calling routine (see, e.g., FIG. 6) at 795.

Figure 8:
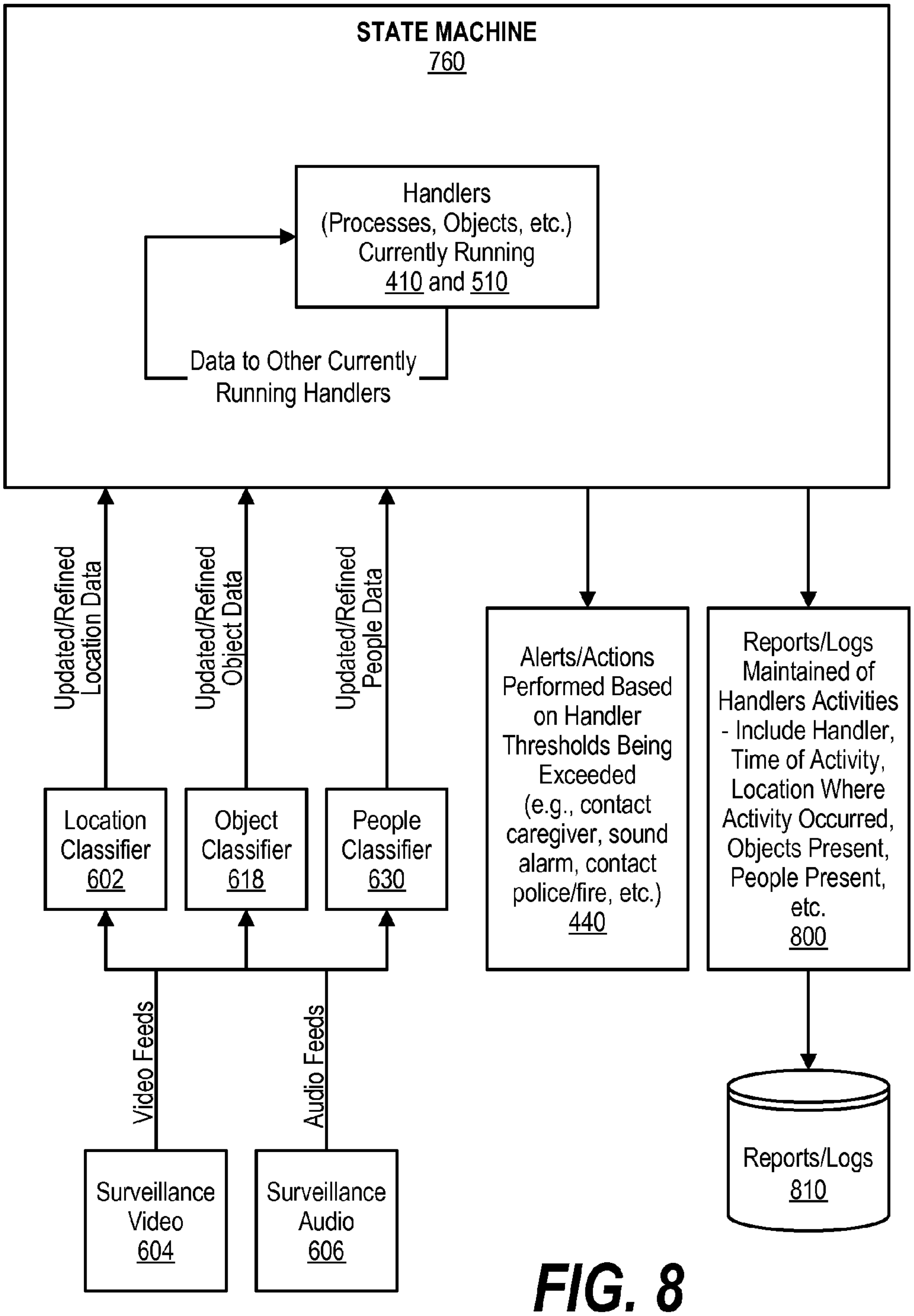
FIG. 8 is a state machine diagram showing handlers receiving various inputs and resulting in generated alerts and reports.

FIG. 8 is a state machine diagram showing handlers receiving various inputs and resulting in generated alerts and reports. State machine 760 includes audio and video handlers (410 and 510) that match the current priority inputs as shown in FIG. 7. Handlers 410 and 510 are running processes that receive external data (location data from location classifier 602, object data from object classifier 618, and people data from people classifier 630) and take appropriate action based on thresholds and actions configured by the user. In addition, some handlers may provide data to other handlers in order to work in conjunction with such other handlers. For example, the audio volume handler may detect a high volume and pass the volume level to the audio tone handler. The audio tone handler may be configured to only trigger an alert if the tone indicates anger or indicates that the dependent individual is upset, but may not trigger the alert if the tone of the dependent individual and/or other people in the dependent individual's proximity are happy which may indicate that the dependent individual, such as a small child, is simply being noisy because they are playing or otherwise happy.

Alerts and actions 440 are performed in response to thresholds of one of the configured handlers running in state machine 760 being exceeded. When a threshold of a configured handler that is currently running in state machine 760 is exceeded, actions can be performed as configured by the user. These actions might be to contact a primary caregiver, such as a mother or father, sounding an audible alarm, or contacting emergency personnel such as the police or fire department, depending on the thresholds and the extent to which they have been exceeded. Step 800 shows that logs or reports are maintained of the various audio and video handlers that are included in the state machine along with timestamps showing when the handlers were active. In addition, priority input data, such as location data, object data, and people data, are also stored in reports/logs 810 along with the times that such locations were entered, such objects were in proximity to the dependent individual, and when such people were in proximity to the dependent individual.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:

configuring a plurality of video handlers that pertain to a dependent individual, wherein the configuring comprises setting an alert threshold for each configured video handler;

configuring a plurality of visual locations, wherein one or more of the visual locations correspond to a habitat of the dependent individual;

configuring a plurality of visual object images that pertain to one or more physical objects;

receiving one or more video streams from one or more video sources directed to the dependent individual;

determining by a surveillance monitoring program, based on comparing the received video streams with the configured plurality of visual locations, a location of the dependent individual;

determining by the surveillance monitoring program, based on comparing the received video streams with the configured plurality of visual object images, one or more physical objects that are in proximity to the dependent individual, initiating one or more of the video handlers based on the location of the dependent individual, and the physical objects that are in proximity to the dependent individual, wherein the initiating comprises adding the video handlers to a state machine, and wherein the video handlers are selected from the group consisting of a physical aggression video handler, a water proximity video handler, an inappropriate touching video handler, an unattended dependent individual video handler, a dangerous object video handler, and an unknown person video handler;

executing the initiated video handlers, wherein the executing video handlers receive updated data from the surveillance monitoring program corresponding to the location of the dependent individual and the physical objects that are in proximity to the dependent individual; and in response to determining that at least some of the updated data exceeds the alert threshold for a selected executing video handler, triggering an alert that includes performing at least one action intended to protect the dependent individual.

2. The method of claim 1 wherein the configuring of at least one of the video handlers includes selecting an action corresponding to the alert threshold for the video handler, and wherein the triggering further comprises performing the action corresponding to the selected executing video handler.

3. The method of claim 2 wherein the action is selected from the group consisting of contacting law enforcement, sounding an audible alarm, contacting a managing caregiver, and contacting a fire department.

4. The method of claim 1 further comprising:

configuring a plurality of audio handlers that pertain to the dependent individual, wherein the configuring comprises setting an alert threshold for each configured audio handler;

configuring a plurality of voice identities that pertain to one or more caregivers of the dependent individual;

configuring a plurality of audible samples that pertain to one or more inanimate objects;

receiving one or more audio streams from one or more audio sources directed to the dependent individual;

determining, by the surveillance monitoring program, based on comparing the received audio streams with the configured plurality of audible samples, one or more additional physical objects in proximity to the dependent individual;

determining, by the surveillance monitoring program, one or more people present with the dependent individual by comparing the plurality of voice identities with the received audio streams;

initiating one or more of the audio handlers based on the additional physical objects in proximity to the dependent individual and the one or more people present with the dependent individual, wherein the initiating comprises adding the audio handlers to the state machine;

executing the initiated audio handlers, wherein the executing audio handlers receive updated data corresponding to the additional physical objects in proximity to the dependent individual and the people present with the dependent individual; and in response to determining that at least some of the updated data exceeds the alert threshold for a selected executing audio handler, triggering a second alert that includes performing at least one second action intended to protect the dependent individual.

5. The method of claim 4 further comprising:

maintaining a log of the initiated video handlers and the initiated audio handlers, wherein the log includes a timestamp when the initiated video and audio handlers were initiated, a list of one or more locations where the dependent individual was located, a list of one or more physical objects in proximity to the dependent individual, and a list of one or more people in proximity to the dependent individual.

6. A information handling system comprising:

one or more processors;

a memory accessible by at least one of the processors;

a nonvolatile storage device accessible by at least one of the processors;

one or more video input devices that provide one or more digital video streams accessible by the one or more processors;

one or more audio input devices that provide one or more digital audio streams accessible by the one or more processors;

a set of instructions stored in the memory and executed by at least one of the processors in order to perform actions of:

configuring a plurality of video handlers that pertain to a dependent individual, wherein the configuring comprises setting an alert threshold for each configured video handler;

configuring a plurality of visual locations, wherein one or more of the visual locations correspond to a habitat of the dependent individual;

configuring a plurality of visual object images that pertain to one or more physical objects;

receiving the digital video streams from the one or more video input devices, wherein the digital video streams are directed to the dependent individual;

determining by a surveillance monitoring program, based on comparing the received digital video streams with the configured plurality of visual locations, a location of the dependent individual;

determining by the surveillance monitoring program, based on comparing the received video streams with the configured plurality of visual object images, one or more physical objects that are in proximity to the dependent individual, initiating one or more of the video handlers based on the location of the dependent individual, and the physical objects that are in proximity to the dependent individual, wherein the initiating comprises adding the video handlers to a state machine executed by at least one of the one or more processors, and wherein the video handlers are selected from the group consisting of a physical aggression video handler, a water proximity video handler, an inappropriate touching video handler, an unattended dependent individual video handler, a dangerous object video handler, and an unknown person video handler;

executing the initiated video handlers, wherein the executing video handlers receive updated data from the surveillance monitoring program corresponding to the location of the dependent individual and the physical objects that are in proximity to the dependent individual; and in response to determining that at least some of the updated data exceeds the alert threshold for a selected executing video handler, triggering an alert that includes performing at least one action intended to protect the dependent individual.

7. The information handling system of claim 6 wherein the configuring of at least one of the video handlers includes selecting an action corresponding to the alert threshold for the video handler, and wherein the triggering further comprises performing the action corresponding to the selected executing video handler.

8. The information handling system of claim 7 wherein the action is selected from the group consisting of contacting law enforcement, sounding an audible alarm, contacting a managing caregiver, and contacting a fire department.

9. The information handling system of claim 6 wherein the set of instructions, when executed, cause at least one of the processors to perform further actions comprising:

configuring a plurality of audio handlers that pertain to the dependent individual, wherein the configuring comprises setting an alert threshold for each configured audio handler;

configuring a plurality of voice identities that pertain to one or more caregivers of the dependent individual;

configuring a plurality of audible samples that pertain to one or more inanimate objects;

receiving one or more digital audio streams from one or more audio input devices directed to the dependent individual;

determining, by the surveillance monitoring program, based on comparing the received digital audio streams with the configured plurality of audible samples, one or more additional physical objects in proximity to the dependent individual;

determining, by the surveillance monitoring program, one or more people present with the dependent individual by comparing the plurality of voice identities with the received digital audio streams;

initiating one or more of the audio handlers based on the additional physical objects in proximity to the dependent individual and the one or more people present with the dependent individual, wherein the initiating comprises adding the audio handlers to the state machine;

executing the initiated audio handlers, wherein the executing audio handlers receive updated data corresponding to the additional physical objects in proximity to the dependent individual and the people present with the dependent individual; and in response to determining that at least some of the updated data exceeds the alert threshold for a selected executing audio handler, triggering a second alert that includes performing at least one second action intended to protect the dependent individual.

10. The information handling system of claim 9 wherein the set of instructions, when executed, cause at least one of the processors to perform further actions comprising:

maintaining a log of the initiated video handlers and the initiated audio handlers, wherein the log includes a timestamp when the initiated video and audio handlers were initiated, a list of one or more locations where the dependent individual was located, a list of one or more physical objects in proximity to the dependent individual, and a list of one or more people in proximity to the dependent individual.

11. A computer program product stored in a non-transitory computer readable medium, comprising functional descriptive material that, when executed by an information handling system, causes the information handling system to perform actions that include:

configuring a plurality of video handlers that pertain to a dependent individual, wherein the configuring comprises setting an alert threshold for each configured video handler;

configuring a plurality of visual locations, wherein one or more of the visual locations correspond to a habitat of the dependent individual;

configuring a plurality of visual object images that pertain to one or more physical objects;

receiving one or more video streams from one or more video sources directed to the dependent individual;

determining by a surveillance monitoring program, based on comparing the received video streams with the configured plurality of visual locations, a location of the dependent individual;

determining by the surveillance monitoring program, based on comparing the received video streams with the configured plurality of visual object images, one or more physical objects that are in proximity to the dependent individual, initiating one or more of the video handlers based on the location of the dependent individual, and the physical objects that are in proximity to the dependent individual, wherein the initiating comprises adding the video handlers to a state machine, and wherein the video handlers are selected from the group consisting of a physical aggression video handler, a water proximity video handler, an inappropriate touching video handler, an unattended dependent individual video handler, a dangerous object video handler, and an unknown person video handler;

executing the initiated video handlers, wherein the executing video handlers receive updated data from the surveillance monitoring program corresponding to the location of the dependent individual and the physical objects that are in proximity to the dependent individual; and in response to determining that at least some of the updated data exceeds the alert threshold for a selected executing video handler, triggering an alert that includes performing at least one action intended to protect the dependent individual.

12. The computer program product of claim 11 wherein the configuring of at least one of the video handlers includes selecting an action corresponding to the alert threshold for the video handler, and wherein the triggering further comprises performing the action corresponding to the selected executing video handler.

13. The computer program product of claim 12 wherein the action is selected from the group consisting of contacting law enforcement, sounding an audible alarm, contacting a managing caregiver, and contacting a fire department.

14. The computer program product of claim 11 further comprising functional descriptive material that causes the data processing system to perform additional actions that include:

configuring a plurality of audio handlers that pertain to the dependent individual, wherein the configuring comprises setting an alert threshold for each configured audio handler;

configuring a plurality of voice identities that pertain to one or more caregivers of the dependent individual;

configuring a plurality o audible samples that pertain to one or more inanimate objects;

receiving one or more audio streams from one or more audio sources directed to the dependent individual;

determining, by the surveillance monitoring program, based on comparing the received audio streams with the configured plurality of audible samples, one or more additional physical objects in proximity to the dependent individual;

determining, by the surveillance monitoring program one or more people present with the dependent individual by comparing the plurality of voice identities with the received audio streams;

initiating one or more of the audio handlers based on the additional physical objects in proximity to the dependent individual and the one or more people present with the dependent individual, wherein the initiating comprises adding the audio handlers to the state machine;

executing the initiated audio handlers, wherein the executing audio handlers receive updated data corresponding to the additional physical objects in proximity to the dependent individual and the people present with the dependent individual;

in response to determining that at least some of the updated data exceeds the alert threshold for a selected executing audio handler, triggering a second alert that includes performing at least one second action intended to protect the dependent individual; and maintaining a log of the initiated video handlers and the initiated audio handlers, wherein the log includes a timestamp when the initiated video and audio handlers were initiated, a list of one or more locations where the dependent individual was located, a list of one or more physical objects in proximity to the dependent individual, and a list of one or more people in proximity to the dependent individual.

* * * * *